(12) United States Patent
Dwyer et al.

(10) Patent No.: US 7,303,282 B2
(45) Date of Patent: Dec. 4, 2007

(54) MULTIMEDIA DISPLAY DEVICE

(75) Inventors: Dan Dwyer, Battle Ground, WA (US); Robert M. Schnelder, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/693,355

(22) Filed: Oct. 23, 2003

(65) Prior Publication Data

US 2005/0088620 A1    Apr. 28, 2005

(51) Int. Cl.
*G03B 31/00* (2006.01)
*G03B 31/06* (2006.01)
*G03B 21/26* (2006.01)
*G03B 21/22* (2006.01)
*G03B 21/00* (2006.01)

(52) U.S. Cl. ............... 353/15; 353/19; 353/30; 353/119; 353/121; 353/122

(58) Field of Classification Search ........... 353/15, 353/19, 30, 31, 71, 119, 121, 122, 16; 349/5, 349/8, 9; 713/300; 345/2.2; 439/297, 237; 600/437; 40/455; 352/34, 40
See application file for complete search history.

(56) References Cited

U.S. PATENT DOCUMENTS 5,289,287 A    2/1994   Dargis et al. ............... 358/766
5,630,659 A    5/1997   Ronzani et al. .............. 353/15
5,847,748 A *  12/1998  Laughlin ..................... 725/105
6,070,247 A *  5/2000   Wallace et al. .............. 713/300
6,443,574 B1 * 9/2002   Howell et al. ................ 353/13
6,486,862 B1 * 11/2002  Jacobsen et al. .............. 345/88
6,496,122 B2 * 12/2002  Sampsell ............... 340/825.69
6,626,543 B2 * 9/2003   Derryberry .................. 353/119

(Continued)

FOREIGN PATENT DOCUMENTS

WO    WO 03/079678 A1 *    9/2003

OTHER PUBLICATIONS

HP OfficeJetModel 350 Printer-Fax-Copier-Scanner http://www.uni-regensber.de/EDV/PC/hardware/products/hp/officejet350.htm.*
Gyration GO Pro 2.4 (GP6005M) Mouse Specs—Dealtime http://www.dealtime.com/xPF-Thomson-GO-PRO-AIR-MOUSE-100-Range.*
SMART Technologies Inc. Technical Bulletin, Issue 16, Aug. 6, 2003 www.smartech.com/support.*
HP OfficeJetModel 350 Printer-Fax-Copier-Scanner http://www.uni-regensburg.de/EDV/PC/hardware/products/hp/officejet350.htm, date unknown.*
Gyration GO Pro 2.4 (GP6005M) Mouse Specs—Dealtime http://www.dealtime.com/xPF-Thomson-GO-PRO-AIR-MOUSE-100-Range, date unkown.*
SMART Technologies Inc. Technical Bulletin, Issue 16, Aug. 6, 2003 www.smartech.com/support.*

*Primary Examiner*—Melissa Jan Koval

(57) ABSTRACT

A multimedia display device includes a docking station having speakers and a media drive, wherein the docking station is configured to structurally and communicatively couple an image projection device to the docking station.

42 Claims, 5 Drawing Sheets

U.S. PATENT DOCUMENTS

| | | | |
|---|---|---|---|
| 6,827,447 B2* | 12/2004 | Wu | 353/15 |
| 6,939,155 B2* | 9/2005 | Postrel | 439/297 |
| 2003/0195418 A1* | 10/2003 | Barnes et al. | 600/437 |
| 2004/0017548 A1* | 1/2004 | Denmeade | 353/31 |
| 2004/0089140 A1* | 5/2004 | Georges et al. | 84/609 |
| 2004/0091232 A1* | 5/2004 | Appling | 386/46 |
| 2005/0083247 A1* | 4/2005 | Juenger | 345/2.2 |
| 2005/0083486 A1* | 4/2005 | Johnson | 353/15 |

* cited by examiner

MULTIMEDIA DISPLAY DEVICE

BACKGROUND

Portable and stationary audio and visual (A/V) equipment are widely used in business and by consumers. Many users of A/V equipment own multiple devices, each device designed to fill a certain audio and/or video function. For example, in the field of sound, a user may have a portable compact disc (CD) player, a portable motion picture entertainment group compression format number three (MP3) player, a portable AM/FM radio, etc. The same user may also have a stationary CD player, a stationary MP3 player, a stationary AM/FM radio, etc. located at their home. A similar situation exists for video equipment. A user may have a portable video projector, digital versatile/video disc (DVD) player, television (TV), etc. as well as a stationary video projector, DVD player, TV, etc.

Additionally, portable video projectors are commonly used in business meetings or conferences to project slide presentations or other images onto a screen to aid in the presentation. The projector is typically connected to a notebook computer or another portable computing system such as a personal digital assistant (PDA). The notebook computer outputs a display and/or audio signal, which is then connected to the projector via a number of cables. The video signal may be transmitted in one of a variety of manners which include S-Video, component video, digital visual interface (DVI), red green blue horizontal sync vertical sync (RGBHV), video graphics array (VGA), super video graphics array (SVGA), etc. Each method of transmission utilizes a specialized cable. Once the notebook computer is connected to the projector, images and/or motion picture may be projected onto a display surface, generally a wall or a screen.

Often, business people are issued or personally own portable video projectors to use in such meetings and conferences. Many times, these projectors are limited in their use due to the impracticality of connecting and configuring the projector for home or other personal use. Consumers may also have video projectors, which are limited in their use to one room due to the fact that the projector is fastened or permanently mounted to a wall or a ceiling.

SUMMARY

A multimedia display device includes a docking station having speakers and a media drive, wherein the docking station is configured to structurally and communicatively couple an image projection device to the docking station.

BRIEF DESCRIPTION OF THE DRAWINGS

The accompanying drawings illustrate various embodiments of the present method and system and are a part of the specification. The illustrated embodiments are merely examples of the present method and system and do not limit the scope of the present disclosure.

Throughout the drawings, identical reference numbers designate similar, but not necessarily identical, elements.

DETAILED DESCRIPTION

The present specification describes a method and a system for docking an image projection device in a docking station while electronically coupling the image projection device to the docking station. By automatically coupling the image projection device to the docking station, the image projection device has increased utility. In some exemplary embodiments, the docking station may resemble a conventional boom box or shelf stereo system both aesthetically and functionally.

As used in the present specification and in the appended claims, the term "docking station" is meant to be understood broadly as any hardware frame and set of electrical connection interfaces that enable an image projection device to be coupled to and communicate with any number of peripheral components. A docking station can also include a network interface card (NIC) that attaches the image projection device to a local area network (LAN). A docking station may include buttons and/or a remote control for controlling the docking station functions, an infrared (IR) sensor, audio and video outputs, attached or detachable speakers, an interconnect for connecting a projector to the docking station, etc. Similarly, the term "peripheral" component is meant to be understood as any number of media accessing components including, but in no way limited to, one or more of the following: a CD player, a DVD player, a CD/DVD combination drive capable of playing any variation of writable and rewritable discs, a cassette player, a hard disk device (HDD), or an MP3 player.

In the following description, for purposes of explanation, numerous specific details are set forth in order to provide a thorough understanding of the present system and method for docking an image projection device. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1A:
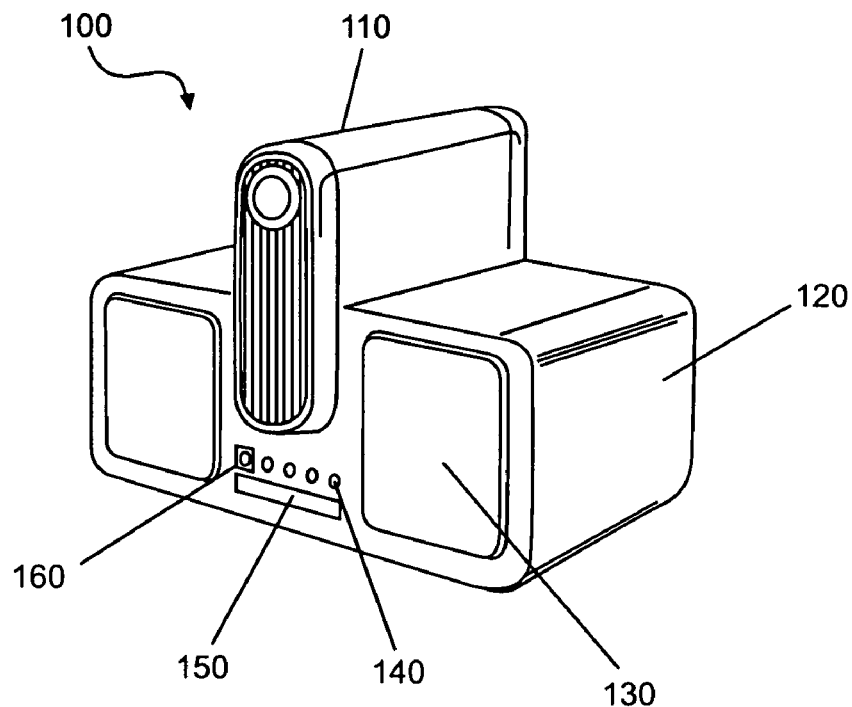
FIG. 1A is a perspective view of an image projection device vertically docked in a docking station according to one exemplary embodiment.
Figure 1B:
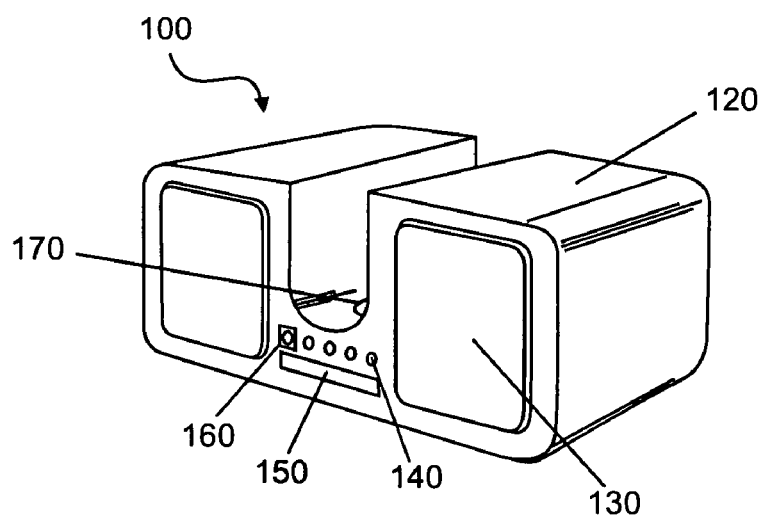
FIG. 1B is a perspective view of an empty docking station according to one exemplary embodiment.

FIG. 1A illustrates an exemplary embodiment of a media system (100) configured to couple a docking station to a vertically mounting image projection device. As shown in FIG. 1A, the media system (100) includes a docking station (120) coupled to a vertically mounting image projection device (110). The image projection device or "projector" (110) illustrated in FIG. 1A is docked in a cavity (125; FIG. 1B), formed in the body of the docking station (120), configured to vertically receive and hold a projector. FIG. 1A also illustrates that the docking station (120) may include a number of speakers (130), control buttons (140), media drives (150), and an infrared (I/R) sensor (160).

Figure 2:
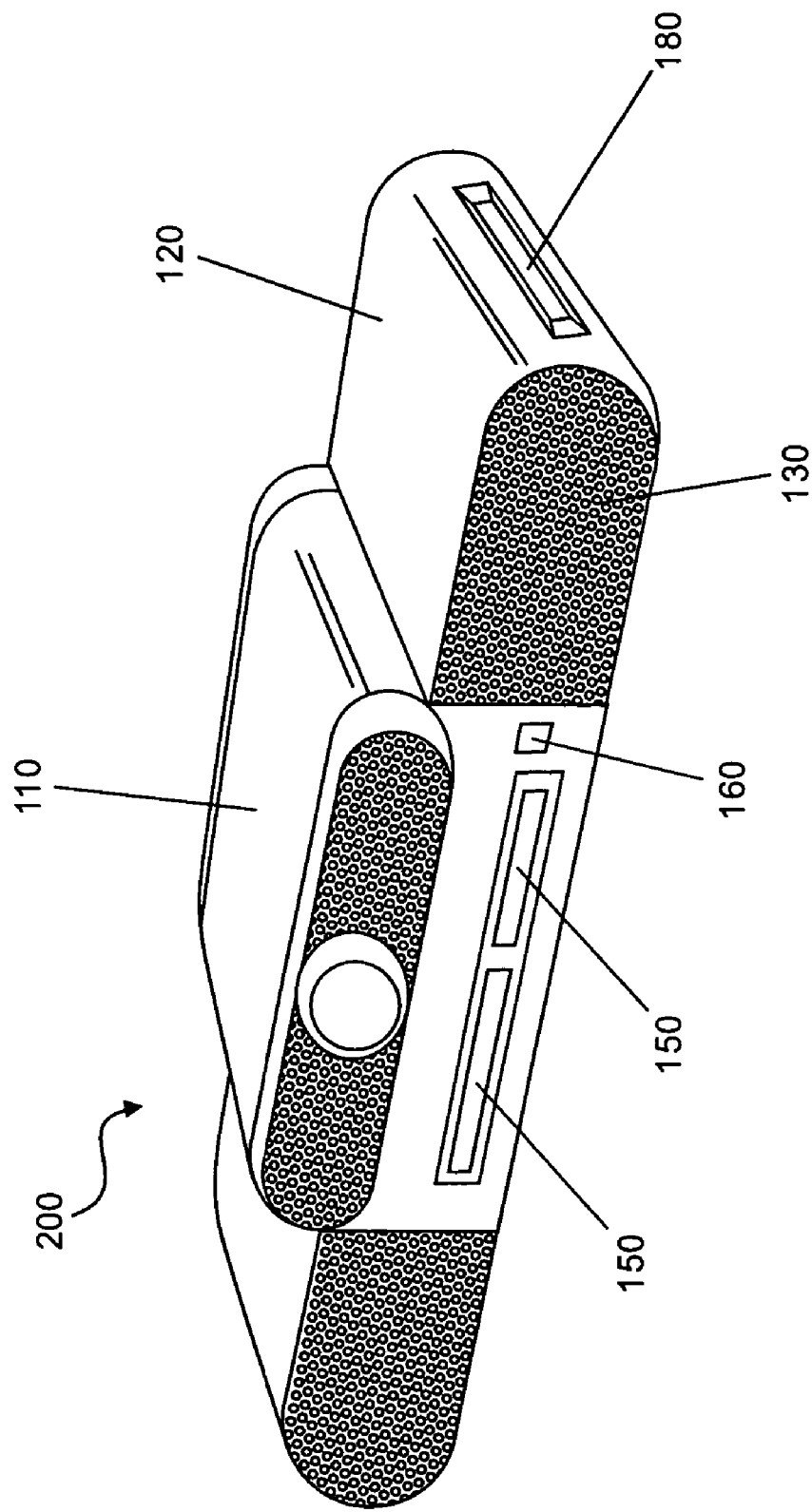
FIG. 2 is a perspective view showing an image projection device horizontally docked in a docking station according to one exemplary embodiment.

The media system (100) illustrated in FIG. 1A may be designed to hold the projector (110) horizontally as shown in FIG. 2, vertically as shown in FIG. 1A, or in any other desirable orientation. The image projection device or projector (110) may be any type of image projection device including, but in no way limited to, a liquid crystal display (LCD) projector, a digital light processing (DLP) projector, a liquid crystal on silicon (LCOS) projector, a slide projector, a film projector, etc. Moreover, the image projection device (110) illustrated in FIG. 1A may include both video and audio inputs, as will be familiar to one skilled in the art.

The docking station (120) illustrated in FIG. 1A is configured to receive and be communicatively coupled to an image projection device (110). The docking station (120) may be composed of any material capable of providing structural support to the docking station's internal components as well as a coupled image projection device (110) including, but in no way limited to, plastics, metals, or composite materials. Similarly, the docking station may be fabricated using any number of fabrication techniques including, but in no way limited to, roto molding, blow molding, deep draw molding, injection molding, casting, forging, or stamping. The components that may be housed in the present docking station (120) may include speakers (130), control buttons (140), media drives (150), and an I/R sensor. The above-mentioned components will now be described in further detail below.

As shown in FIG. 1A, a number of speakers (130) may be disposed in the docking station (120) according to one exemplary embodiment. While FIG. 1A illustrates a docking station (120) housing two speakers (130), the docking station may be electronically coupled to any number of speakers. According to the embodiment illustrated in FIG. 1A, two speakers (130) may be disposed in the docking station (120) to provide a user the possibility of stereo sound. Similarly, five or more speakers (130) may be disposed in and electronically coupled to the docking station (120). Five or more speakers disposed in the docking station provide the user with the ability to produce surround sound according to Dolby Pro Logic® standards. Moreover, the present system and method may also be utilized in connection with a docking station (120) having a single speaker (120) or any number of speakers (120) disposed therein.

In the exemplary embodiment illustrated in FIG. 1A, the docking station (120) may house one or more media drives (150) including, but in no way limited to, a compact disc read-only memory (CD-ROM) drive, a recordable CD (CD-R) drive, a rewritable CD (CD-RW) drive, a digital versatile disc read-only memory (DVD-ROM) drive, a recordable DVD (DVD±R) drive, a rewritable DVD (DVD±RW) drive, a motion picture entertainment group compression format number three (MP3) drive, a DVD/CD/CDRW/MP3 combination drive, a cassette drive, a memory stick or memory card slot, a hard disk device (HDD), etc. Moreover, any combination of the above-mentioned media drives (150) may be housed in and electronically coupled to the present docking station (120). Once electronically coupled to the present docking station (120), the coupled media drives (150) may produce any number of audio and/or video signals that may be routed to and processed by the speakers (130) and the projection device (110), respectively, or through external AN outputs on the docking station (120) (not shown).

FIG. 1A also illustrates a number of control buttons (140) disposed on the docking station (120). The control buttons (140) disposed on the docking station may include any number of control buttons that facilitate or enable the use of the docking station, coupled media drives (150), or a coupled image projection device (110). The control buttons (140) disposed on one exemplary embodiment of the docking station (120) may include, but are in no way limited to, a play button, a stop button, a fast forward button, a rewind button, a previous/next track button, a record button, a volume button, a function button, a mute button, etc.

The exemplary media system (100) illustrated in FIG. 1A also demonstrates the incorporation of an infrared (I/R) sensor (160) in the docking station (120). As shown in FIG. 1A, the docking station (120) may include a coupled I/R sensor (160) which allows the user to remotely select between inputs and control the functions of the docking station (120), coupled media drives (150), and/or a coupled image projection device (110). By way of example only, when a user desires to activate a coupled media drive (150), the user may select a button on a wireless remote control (not shown) programmed to emit infrared signals at a frequency designated to activate the desired media drive. The emitted infrared signals may then be detected by the I/R sensor (160) which then transmits signals that control the desired media drive (150). Other means of sending infrared signals to control the docking station (120) and/or the projector (110) through the I/R sensor (160) include, but are in no way limited to, transmitting infrared signals with a personal digital assistant (PDA), a cell phone, a notebook computer, or a digital watch.

FIG. 1B illustrates a media system (100) without an image projection device (110; FIG. 1A) coupled thereto. With the image projection device (110; FIG. 1A) removed, a projector reception cavity (125) and a system coupling connection (170) are visible. According to one exemplary embodiment, a user may place an image projection device (110; FIG. 1A) into the projector reception cavity (125) where the projection device is automatically physically and electrically coupled to the docking station (120). Once coupled, video or audio signal from the docking station (120) or one of its associated media drives (150) may be projected with the image projection device (110; FIG. 1A) or emitted by the coupled speakers (130). In this manner, the entire media system (100) may function as a single compact media presentation unit.

The projector reception cavity (125) illustrated in FIG. 1B may be any cavity configured to structurally support and hold an image projection device (110; FIG. 1A) while enabling the image projection device to be physically and electronically coupled to the docking station (120). Additionally, the projector reception cavity (125) provides sufficient ventilation for cooling of the image projection device (110; FIG. 1A) during extended periods of image projection. Cooling or heat dissipation away from the image projection device (110; FIG. 1A) may be accomplished by the reception cavity (125) through any number of known methods including, but in no way limited to, natural convection or forced convection. Additionally, the projection reception cavity (125) may provide a power source configured to provide power to the projection device (110; FIG. 1A) to facilitate the active operation and/or charging of the projection device. As shown in FIG. 1B, the cavity (125) may be an oval shaped depression formed in the docking station (120) configured to be molded to the shape of an image projection device (110; FIG. 1A). Alternatively, the projector reception cavity (125) may be a planar shelf or any other shaped shelf upon which the image projection device (110; FIG. 1A) may rest.

As shown in FIG. 1B a connection (170) may be disposed in the projector reception cavity (125). The connection (170) disposed in the projector reception cavity may be specifically designed to enable the automatic coupling of an image projection device (110; FIG. 1A) to the docking station (120). This connection (170) may include but is in no way limited to, a universal serial bus (USB), small computer system interface (SCSI), Bluetooth, IEEE 1394 high speed serial bus, parallel, serial, RCA, coaxial cable, fiber optic, wireless, or other proprietary means of electronic connection. A corresponding connection (not shown) may be present on the image projection device (110; FIG. 1A) to further facilitate the coupling of the image projection device to the docking station (120). The connection on the image projection device (110; FIG. 1A) may include, but is in no way limited to, a universal serial bus (USB), small computer system interface (SCSI), Bluetooth, IEEE 1394 high speed serial bus, parallel, serial, RCA, coaxial cable, fiber optic, wireless, or other proprietary means of electronic connection. Video, audio, data, optical, or any other desired signals from a remote control, power, or other data may be transmitted from the docking station (120) and its associated media drives (150) to the image projection device (110; FIG. 1A) via the interconnect (170).

Moreover, the docking station (120) illustrated in FIG. 1B may function as a standalone audio system when it is not coupled to an image projection device (110; FIG. 1A). The docking station (120) may be portable or stationary and may function on battery power or regular 120-volt power. The docking station (120) may play any form of audio stored on any of the above-mentioned media types including, but in no way limited to, CD audio, MP3's, DVD audio, cassette audio, .wav files, midi files, etc. The sound produced by the above-mentioned media types may be output through speakers (130) or through audio outputs built in to the docking station (130).

As will be familiar to one skilled in the art, the audio and/or video signals generated by the present system and method may be amplified or otherwise conditioned using an amplifier, an equalizer, filters of various types, a digital to analog converter (DAC), etc. The signal conditioning may be performed either internally by the docking station (120) or externally with separate devices. Additionally, the audio and/or video signals may be transmitted directly to the image projection device (110; FIG. 1A) digitally without any analog-to-digital or digital-to-analog conversions.

FIG. 2 is an illustration of an alternative embodiment of a projector (110) docked in a docking station (120). In the exemplary embodiment show in FIG. 2, the system (200) includes an image projection device (110) horizontally disposed in the docking station (120). The interconnect (170, FIG. 1b) coupling the image projection device (110) to the docking station (120) may be located on any surface of the image projection device (110) that may come into direct contact with the docking station (120). When the projector (110) is placed in the specially formed cavity (125; FIG. 1B) configured to hold the projector (110), the projector (110) is automatically electronically and physically coupled to the docking station (120). In some embodiments, the image projection device (110) and the docking station (120) may act as a single unit and may be controlled as a single unit. For example, buttons (140, FIG. 1a) may be disposed on the docking station (120) that, when actuated, may control both audio and video functions. A single remote control may also be used to control both the projector (110) and the docking station (120) when the two are electronically coupled.

FIG. 2 also illustrates handles (180) disposed on the docking station (120). By incorporating handles in the docking station (120), the present system (200) may be easily transported by a user. The handles (180) illustrated in FIG. 2 are shown as recessed cavities on the side of each speaker (130). However, the handles incorporated by the present system (200) may be of any shape or form including, but in no way limited to, a strap, recessed cavities, or a moveable handle.

Additionally, the docking station (120) and/or the image projection device (110) may be designed and built to various heights, widths, depths, etc., with various decorations, button and media drive layouts, etc. The docking station (120) may be designed to accommodate various sizes and shapes of image projection devices (110) and may be adjustable so that the same docking station (120) is capable of coupling a variety of different projectors. While the image projection device (110) illustrated in FIG. 2 is shown docked in the docking station (120), the image projection device (110) may be separated from the docking station and used as a normal, portable image projection device.

Figure 3:
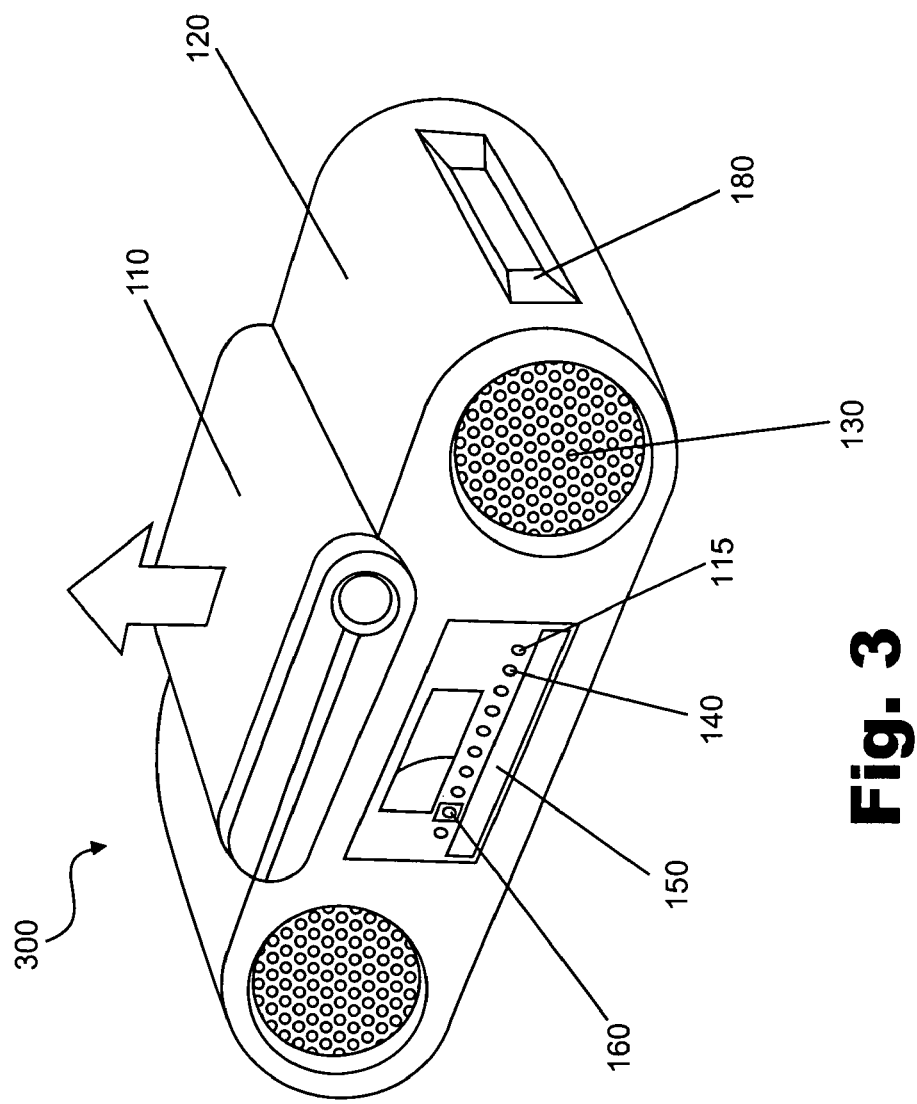
FIG. 3 is a perspective view of an image projection device docked in a docking station according to one exemplary embodiment.

FIG. 3 illustrates yet another exemplary embodiment of the present system and method in which an alternative design and layout is used (300). In this exemplary embodiment illustrated in FIG. 3, the docking station (120) resembles a portable stereo system or "boom box." The docking station (120) illustrated in FIG. 3 includes two round speakers (130), a button interface (140) for controlling the docking station (120), an IR sensor (160) for receiving a remote control signal, a media drive (150), and handles (180) for transporting the docking station (120). The illustrated docking station (120) has a specially formed cavity configured to receive and horizontally couple an image projection device (110). The image projection device (110) shown is completely removable and useable independent of the docking station (120). When the image projection device (110) is placed in the cavity designed to receive the image projection device (110), the image projection device (110) is electronically and physically coupled to the docking station (120) and both may be controlled as a single unit.

Figure 4:
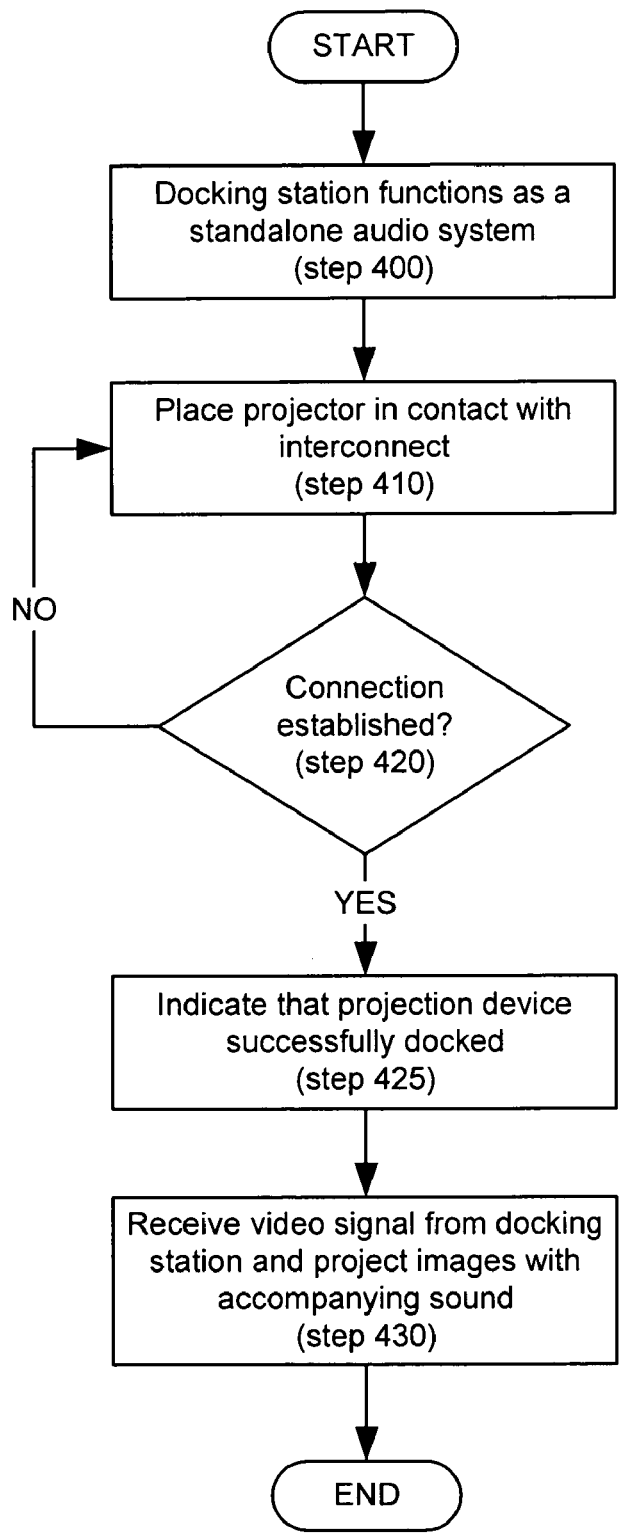
FIG. 4 is a flow chart describing a method of operating the present system according to one exemplary embodiment.

FIG. 4 illustrates a method of operating the image projection device (110; FIG. 1A) and the docking station (120; FIG. 1A). Both the image projection device (110; FIG. 1A) and the docking station (120; FIG. 1A) may be used separately as standalone devices: the docking station may play audio media and the image projection device may project images (step 400). When the image projection device (110; FIG. 1A) is coupled to the interconnect (step 410), the image projection device is automatically electronically and physically coupled to the docking station (120; FIG. 1A). Once coupled, the image projection device (110; FIG. 1A) may project images in synch with corresponding audio that is emitted from the speakers (130; FIG. 1A) of the docking station (120; FIG. 1A). If the two devices are successfully coupled, an indicator (115; FIG. 3) maybe employed (step 425) to inform the user that the image projection device (110; FIG. 1A) was successfully docked and coupled to the docking station (120; FIG. 1A). For example, a light such as a light emitting diode (LED) may turn on, flash, or otherwise indicate that the connection was made (step 425). Alternatively, if the docking station (120) has a visual display, words may be displayed indicating that the connection was made. If the connection is established (YES, step 420), video and audio may be received by the system (100; FIG. 1A) and presented together (step 430). If, however, the connection has not been established (NO, step 420), the image projection device (110; FIG. 1A) is reseated in the docking station (120; FIG. 1A).

Figure 5:
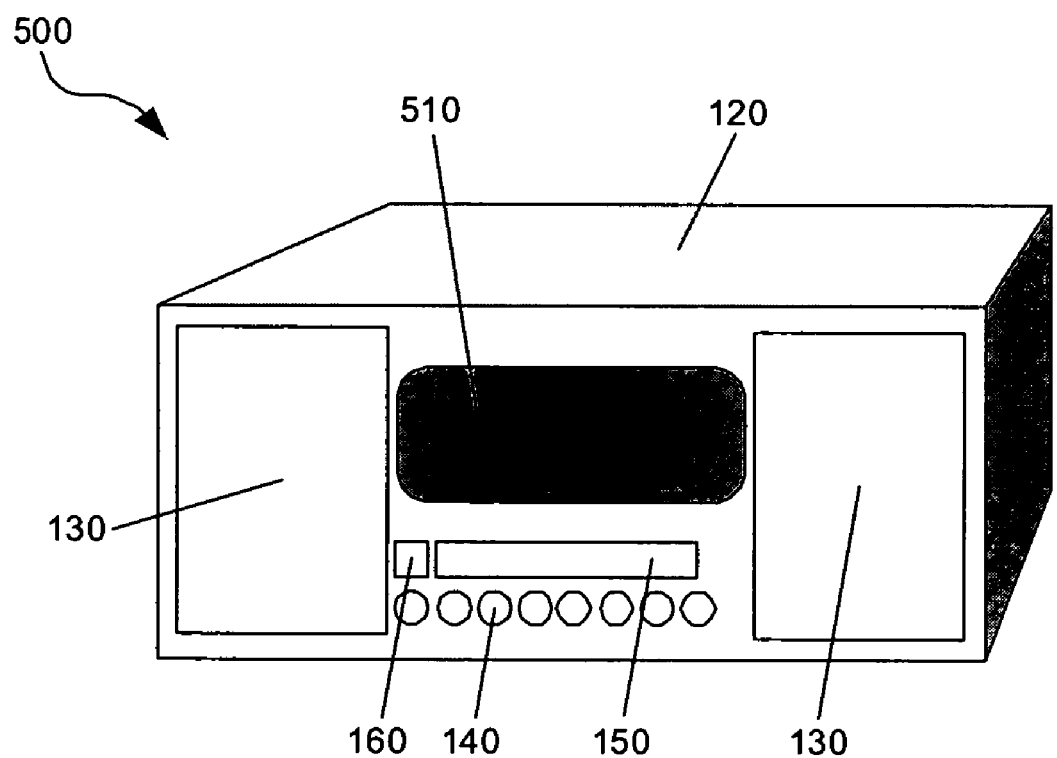
FIG. 5 is a perspective view of an empty docking station including an automatic docking bay according to one exemplary embodiment.

FIG. 5 illustrates an alternative docking station (500) including a receiving mechanism (510) designed to accept and mechanically translate an image projection device (110; FIG. 1A) into a docked position, similar to the way a video cassette is mechanically translated by a video cassette recorder (VCR). In this exemplary embodiment, the interconnect (170; FIG. 1B) between the image projection device (110; FIG. 1A) and the docking station (510) is coupled to the image projection device (110; FIG. 1A) as it is mechanically translated into place. This method would prevent a user from forcefully inserting an image projection device (110; FIG. 1A) into the docking station (510) and possibly breaking or bending a component. Additionally, the mechanically receiving mechanism (510) ensures that the image projection device (110; FIG. 1A) is properly placed so as to be electronically and physically coupled to the docking station (510).

In conclusion, the present media system, in its various embodiments, is capable of combining the functionality of a stereo audio system and an image projection device. More particularly, a projector may be docked in a docking station where the projector is automatically electronically and physically coupled to the docking station. Media signals may then be transmitted from the docking station to the image projection device through the electronic couple. Once coupled, both devices may act as a single unit outputting synchronous sound and video and may be controlled as a single unit. By using such a docking station, a user may add functionality to an image projection device easily and conveniently.

The preceding description has been presented only to illustrate and describe embodiments of the present method and system. It is not intended to be exhaustive or to limit the disclosure to any precise form disclosed. Many modifications and variations are possible in light of the above teaching. It is intended that the scope of the present system and method be defined by the following claims.

What is claimed is:

1. A multimedia display device comprising:
    a docking station including speakers and a media drive;
    wherein said docking station is configured to selectively and releasably couple a projector to said docking station;
    wherein said docking station includes a dedicated indicator that indicates when said projector is successfully coupled to said docking station; and
    wherein said docking station further comprises an infrared (I/R) sensor configured to receive control commands from a remote control.

2. The multimedia display device of claim 1, wherein said docking station further comprises an electrical interconnect.

3. The multimedia display device of claim 2, wherein said projector is coupled to said docking station through said electrical interconnect.

4. The multimedia display device of claim 1, wherein said projector receives a video signal from said docking station via said electrical interconnect.

5. The multimedia display device of claim 4, wherein said video signal from said docking station is in synch with an audio signal output by said speakers of said docking station.

6. The multimedia display device of claim 1, wherein said media drive comprises one of a compact disc read-only memory (CD-ROM) drive, a recordable CD (CD-R) drive, a rewritable CD (CD-RW) drive, a digital versatile disc read-only memory (DVD-ROM) drive, a recordable DVD (DVD±R) drive, a rewritable DVD (DVD±RW) drive, a motion picture entertainment group compression format number three (MP3) drive, a DVD/CD/CDRW/MP3 combination drive, a cassette drive, a memory stick, a memory card slot, a hard disk device, or an AM/FM receiver.

7. The multimedia display device of claim 1, wherein said control commands are delivered through said docking station to control said projector.

8. The multimedia display device of claim 1, wherein said docking station further comprises a plurality of control buttons configured to control an operation of said docking station.

9. The multimedia display device of claim 1, further comprising a handle disposed on said docking station.

10. The multimedia display device of claim 1, wherein said projector comprises one of a liquid crystal display (LCD) projector, a digital light processing (DLP) projector, a liquid crystal on silicon (LCOS) projector, a slide projector, or a film projector.

11. The multimedia display device of claim 1, wherein said docking station further comprises:
    a body; and
    a cavity disposed in said body;
    wherein said cavity is configured to structurally support said projector.

12. The multimedia display device of claim 11, wherein said cavity is configured to support said projector in a horizontal position.

13. The multimedia display device of claim 1, wherein said speakers comprise two speakers configured to provide stereo sound.

14. The multimedia display device of claim 1, wherein said speakers are round.

15. The multimedia display device of claim 1, wherein said docking station is not a general-purpose computer.

16. The multimedia display device of claim 1, wherein said projector is a separate self-contained unit.

17. The multimedia display device of claim 1, wherein the docking station is configured to function as a standalone audio system when not coupled to said projector.

18. A method of coupling an image projection device to a media source comprising:
    providing an independent image projection device;
    providing a docking station for supporting said image projection device, said docking station comprising said media source;
    selectively coupling said image projection device to said docking station by mounting said image projection device onto said docking station; and indicating with a dedicated indicator when said image projection device is successfully coupled to said docking station; and
    remotely controlling said docking station or image projection device with an infrared (I/R) remote control.

19. The method of claim 18, wherein said docking station comprises an audio system.

20. The method of claim 18, wherein said mounting said image projection device onto said media source further comprises electrically coupling said image projection device and said media source through an electrical interconnect.

21. The method of claim 18, wherein said remotely controlling said media source further comprises:
    receiving an I/R signal from a remote control with a receiver of said docking station; and
    communicating a command from said docking station to said image projection device in response to said received signal.

22. The method of claim 21, wherein said command is communicated through an electrical interconnect.

23. The method of claim 18, wherein said media source comprises one of a compact disc read-only memory (CD-ROM) drive, a recordable CD (CD-R) drive, a rewritable CD (CD-RW) drive, a digital versatile disc read-only memory (DVD-ROM) drive, a recordable DVD (DVD±R) drive, a rewritable DVD (DVD±RW) drive, a motion picture entertainment group compression format number three (MP3) drive, a DVD/CD/CDRW/MP3 combination drive, a cassette drive, a memory stick, a memory card slot, a hard disk device, or an AM/FM receiver.

24. The method of claim 18, wherein said coupling said image projection device to said docking station comprises coupling said image projection device in a horizontal position.

25. The method of claim 18, wherein said image projection device and said docking station output synchronous video and audio signals, respectively.

26. The method of claim 18, wherein said dedicated indicator is disposed on said docking station and said method further comprises indicating with said indicator on said docking station when said image projection device and docking station are electrically connected.

27. A multimedia display device comprising:
a projection means for projecting an image; and
a housing means including audio means for producing audio signals and media generating means for generating media signals;
wherein said housing means is configured to structurally and communicatively couple said projection means, said housing means being further configured to selectively and releasably coupled with said projection means; and
control means for remotely controlling said housing means or said projection means with an infrared (I/R) remote control.

28. The multimedia display device of claim 27, wherein said housing means further comprises coupling means for electrically coupling said projection means to said housing means.

29. The multimedia display device of claim 28, wherein said coupling means is configured to electrically couple said housing means to said projection means by disposing said projection means in said housing means.

30. The multimedia display device of claim 27, wherein said projection device comprises one of a liquid crystal display (LCD) projector, a digital light processing (DLP) projector, a liquid crystal on silicon (LCOS) projector, a slide projector, or a film projector.

31. The multimedia display device of claim 27, wherein said audio means comprises a number of speakers.

32. The multimedia display device of claim 31, wherein at least one of said speakers is round.

33. The multimedia display device of claim 31, wherein said speakers comprise two speakers configured to provide stereo sound.

34. The multimedia display device of claim 27, wherein said media generating means comprises one of a compact disc read-only memory (CD-ROM) drive, a recordable CD (CD-R) drive, a rewritable CD (CD-RW) drive, a digital versatile disc read-only memory (DVD-ROM) drive, a recordable DVD (DVD±R) drive, a rewritable DVD (DVD±RW) drive, a motion picture entertainment group compression format number three (MP3) drive, a DVD/CD/CDRW/MP3 combination drive, a cassette drive, a memory stick, a memory card slot, a hard disk device, or an AM/FM receiver.

35. The multimedia display device of claim 27, wherein said housing means further comprises:
a body; and
a cavity disposed in said body;
wherein said cavity is configured to structurally support said projection means.

36. The device of claim 27, wherein said housing means comprise a docking station that is not a general-purpose computer, but configured to communicate with said projection means and/or output an audio signal.

37. A system, comprising:
a projector; and
a docking station including a speaker and a media drive within a housing configured to selectively and releasably couple to said projector,
wherein said projector is further configured to receive a video signal from said media drive and to project images using said video signal, and wherein said docking station further comprises an infrared (I/R) sensor configured to receive control commands from a remote control.

38. The system of claim 37, wherein said docking station includes an interface.

39. The system of claim 37, wherein said projector comprises one of a liquid crystal display (LCD) projector, a digital light processing (DLP) projector, a liquid crystal on silicon (LCOS) projector, a slide projector, or a film projector.

40. The system of claim 37, wherein said docking station includes an electronic coupling to a speaker outside said housing of said docking station.

41. The system of claim 38, wherein said projector is configured to receive media data from said docking station through an electrical connection included in said interface.

42. The system of claim 41, wherein said electrical connection comprises one of a universal serial bus (USB), a small computer system interface (SCSI), a Bluetooth connection, an IEEE 1394 high speed serial bus, a parallel connection, a serial connection, a radio corporation of America (RCA) connector, a coaxial cable connector, a fiber optic connector, or a wireless connector.

* * * * *

UNITED STATES PATENT AND TRADEMARK OFFICE
CERTIFICATE OF CORRECTION

PATENT NO. : 7,303,282 B2  Page 1 of 1
APPLICATION NO. : 10/693355
DATED : December 4, 2007
INVENTOR(S) : Dan Dwyer et al.

It is certified that error appears in the above-identified patent and that said Letters Patent is hereby corrected as shown below:

On the Title page Item -56-, under "Other Publications", lines 1-3, delete "HP OfficeJetModel 350 Printer-Fax-Copier-Scanner http://www.uni-regensber. de/EDV/PC/hardware/products/hp/officejet350.htm.*".

On the Title page, Item -56-, under "Other Publications", lines 4-6, delete "Gyration GO Pro 2.4 (GP6005M) Mouse Specs--Dealtime http://www.dealtime.com/xPF-Thomson-GO-PRO-AIR-MOUSE-100-Range.*".

On the Title page, Item -56-, under "Other Publications", lines 7-8, delete "SMART Technologies Inc. Technical Bulletin, Issue 16, Aug. 6, 2003 www.smartech.com/support.*".

Signed and Sealed this

Eighth Day of July, 2008

JON W. DUDAS
*Director of the United States Patent and Trademark Office*